July 1, 1958      H. L. KINCAID      2,841,761
ENGINE TROUBLE DETECTING DEVICE
Filed Nov. 24, 1954      2 Sheets-Sheet 1
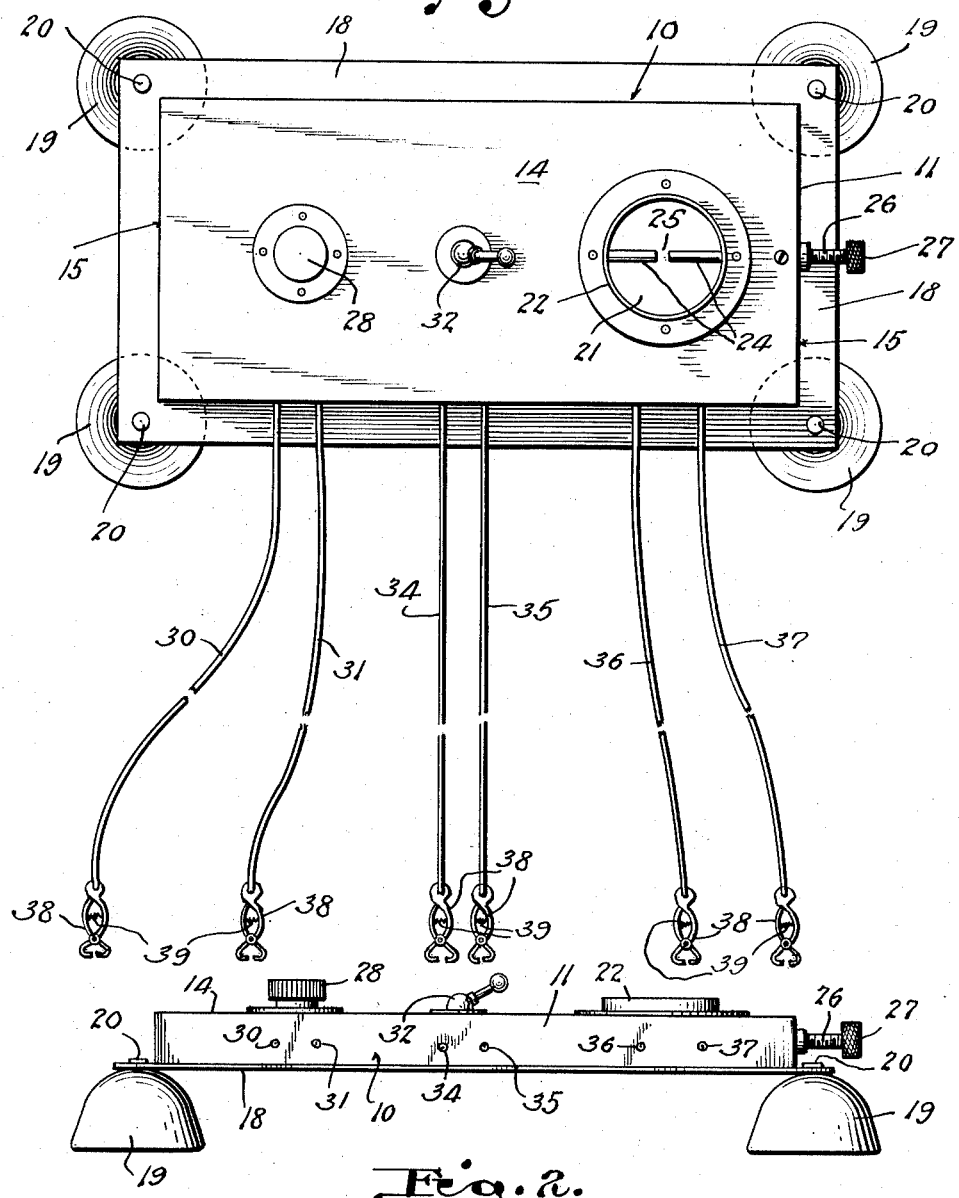
INVENTOR
H. L. Kincaid July 1, 1958 H. L. KINCAID 2,841,761
ENGINE TROUBLE DETECTING DEVICE
Filed Nov. 24, 1954 2 Sheets-Sheet 2

H. L. Kincaid
INVENTOR

BY *Clemow & Clemow*
ATTORNEYS.

United States Patent Office 2,841,761
Patented July 1, 1958

2,841,761

ENGINE TROUBLE DETECTING DEVICE

Horace L. Kincaid, Tuscaloosa, Ala.; James D. Kincaid, administrator of said Horace L. Kincaid, deceased, assignor of one-half to Susan Kincaid and one-half to Marvin O. Tidmore, Tuscaloosa, Ala.

Application November 24, 1954, Serial No. 471,015

1 Claim. (Cl. 324—18)

This invention relates to an engine trouble detecting device.

It is an object of this invention to provide an engine trouble detecting device of the kind to be more particularly described hereinafter which may be attached onto an engine having trouble which must be repaired thereby requiring the service of only a single mechanic for operating the engine and noting the type of repair which is needed rather than the use of two or more mechanics with their added cost.

Another object of this invention is to provide an engine trouble detector or locating device of this kind which is in the nature of a spark detector for determining which, if any of the spark plugs is not properly functioning and the proper spark gap in any one or all of the spark plugs while the engine is operating.

Other and further objects and advantages of the invention will be hereinafter described and the novel features thereof defined in the appended claim.

In the drawings:

Fig. 1 is a top plan view, partly broken away, of a novel engine trouble detecting device constructed according to an embodiment of my invention.

Fig. 2 is a side elevation therefor.

Figure 3:
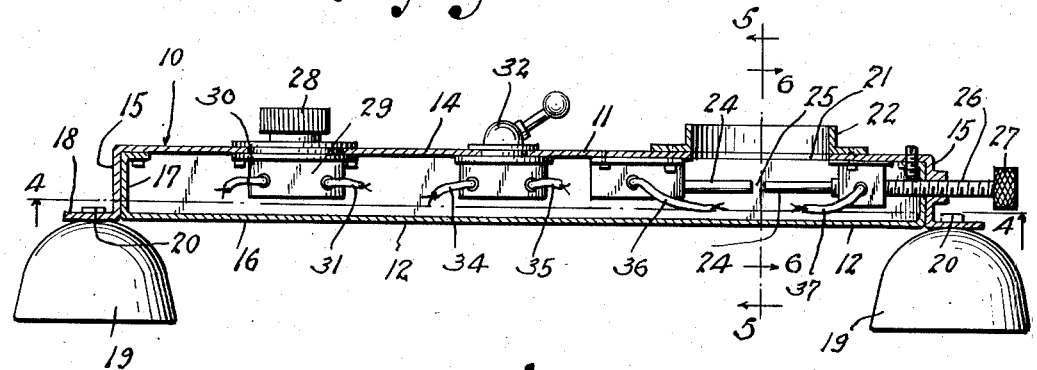
Fig. 3 is a longitudinal section of the device.
Figure 4:
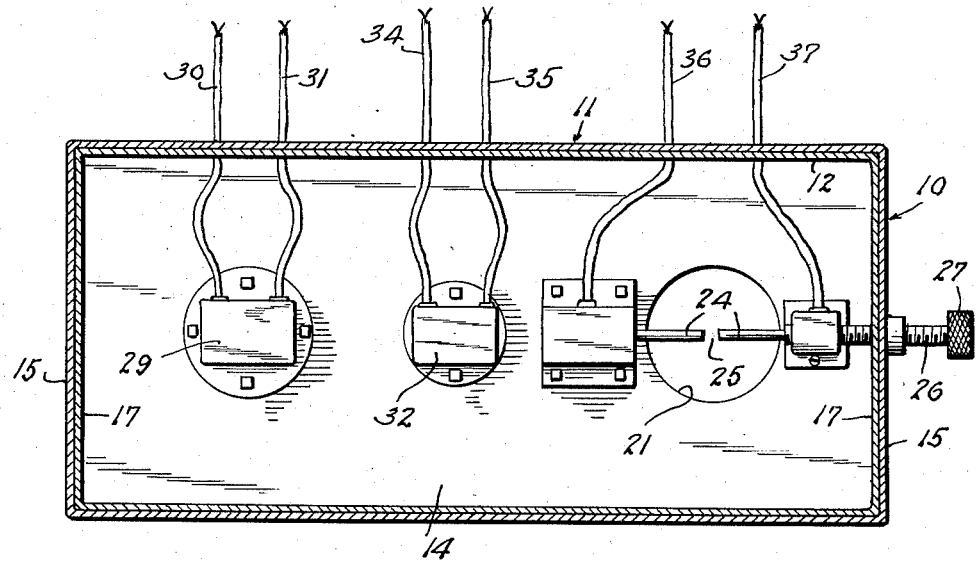
Fig. 4 is a longitudinal section taken on the line 4—4 of Fig. 3.

At the present time it is frequently difficult to determine where any trouble is in an engine while the engine is running and it is with this in mind that I have invented and disclosed my invention so that only a single mechanic will be necessary to determine where any trouble is in the engine which will not operate properly.

Referring now more particularly to the drawings the numeral 10 designates generally an engine trouble detecting device or detector for indicating to the mechanic where and if any trouble exists in the engine. The engine trouble detector 10 may be supported or adjacent to the engine to be tested while the testing is being performed thereon.

The engine trouble detecting device 10 is formed of a flat receptacle 11 which includes an inner receptacle body 12 and an outer receptacle body telescopically engaged with the inner receptacle body in the manner shown in the drawings.

There is provided a top wall 14 on the flat receptacle 11 which has depending flanges 15 about the periphery thereof in the manner clearly shown in the drawings. The bottom wall 16 of the receptacle body 12 is spaced downwardly from the top wall 14 and has an upstanding flange 17 on the inner side of the receptacle which abuts the inner side of the depending flanges 15 from the top wall 14 as clearly noted in Figs. 3, 5 and 6 of the drawings.

An outwardly extending flange 18 is bent on the lower end of the depending flanges 15, there being a plurality of vacuum cups 19 depending from the outwardly extending flange 18. The vacuum cups 19 are particularly adapted for attachment to a support, not shown in the drawings, for the detecting device 10 and the vacuum cups 19 are secured to the flange 18 by fastening elements 20 which may be in the nature of rivets, screws or other suitable and appropriate fastening devices.

In the top wall 14 there are provided a plurality of enlarged openings 21 therethrough for the purposes to be hereinafter described.

An upwardly extending collar 22 is engaged on the upper surface of the top wall 14 and extends upwardly therefrom through which the carbon electrode 24 may be easily viewed from a position exteriorly of the detecting device 10 after it is set into operation.

The carbon electrodes 24 are so located relative to each other that there is a gap 25 provided between one end of each of the electrodes 24, this gap representing the gap ordinarily presented in a spark plug.

As set up one end of one of the electrodes 24 is secured to the lower surface of the top wall 14 and the outer end of the other of the electrodes 24 is attached to an outwardly extending screw 26 so that this one electrode may be moved toward or away from the other electrode which is relatively fixed in the detecting device 10.

A finger knob 27 is formed on or secured to one end of the screw 26 outwardly of the detection device 10 so that the electrodes may be moved close to each other or away from each other as desired by the mechanic operating this detecting device.

Figure 5:
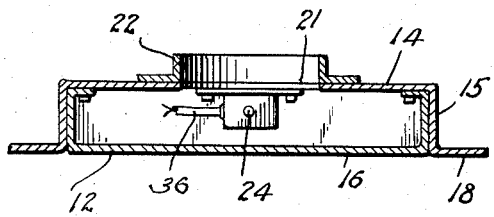
Fig. 5 is a detailed transverse cross section taken on the line 5—5 of Fig. 3.
Figure 6:
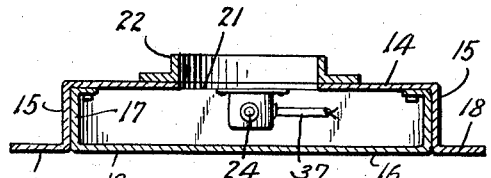
Fig. 6 is a detailed transverse cross section taken on the line 6—6 of Fig. 3.

For the actuation of the detecting device there is provided a starter switch button 28 carried by the top wall 14 with a portion of the starter switch button 28 extending outwardly and upwardly from the top wall as can be clearly noted in Fig. 5 of the drawings. The starter switch 29 actuated by the starter switch button 28 is disposed within the engine trouble detecting device below the top wall 14 and within the confines of the flat receptacle body 12.

There is provided a positive lead 30 and a negative lead 31 for the starter switch 29 and these leads may derive their electric energy from the starter lines on the device to be tested.

Intermediate the length of the detecting device 10 there is provided a master switch 32 adjacent to the starter switch button 28 and remote from the other end of the device.

Connected to the master switch 32 there are provided a positive lead 34 and a negative lead 35 which are respectively connected to the voltage regulator and coil of the gasoline engine, not shown in the drawings.

Also connected to the detector 10 there are a pair of spaced apart leads 36, the positive, and 37, the negative, to the spark regulator normally provided on an engine to be tested.

Everyone of these leads has a spring pressed clamp 38 on the end thereof remote from the device as this clamp is spring pressed to clamping engagement with a spark plug or other device to be tested by a spring 39 between the jaws of the clamp 38.

As described above, the top wall 14 with its depending flanges constitutes an outer receptacle while the bottom wall 16 with its upstanding flanges 17 constitutes an inner receptacle. The inner receptacle is designated generally by the reference numeral 40 in the drawings and when this detecting device 10 is to be used the respective leads, extending outwardly therefrom, are adapted to be clamped to their respective terminals on the engine so that the operation of the spark plugs can be clearly seen by the mechanic. The setting of any one of the spark plugs of the engine is designated by the spark between the electrodes 24 in the gap 25 and this gap may be enlarged or reduced by the mechanic when the finger knob 27 is caused to rotate in the direction so chosen by the mechanic. The electrodes or spark gap of the spark plug so detected may be then determined by the mechanic so that the proper spark plug gap will be provided at the time of the operation of the engine.

At all times the engine trouble detecting device 10 is secured by the vacuum cups 19 onto the body of the engine, the hood thereof, or any other place which may be accessible to the mechanic for conducting such a trouble detecting device on an engine.

By the use of this engine trouble detecting device 10 there is provided a great labor saving since this device can be used by only a single mechanic without getting in or out of the automobile thereby eliminating the necessity of a helper for the mechanic. By using only one mechanic for detecting any trouble on the engine and as he must only get into and out of a car there will be no necessity for soiling the upholstery of the automobile.

If the engine runs and one spark plug is not properly working the spark plug indicator will show which one is not changing the spark indicator when this device is being used. Also a leaking valve can be found with the sparkindicator when the engine will run and a spark is shown but the engine is not working properly. Upon adjustment of the electrodes 24 of this trouble detecting device and the determination that the spark plugs on the engine have the same gap thereon the trouble with the spark plugs of the engine will be thereby eliminated.

While the specific details of one embodiment of this invention have been hereinshown and described the invention is not confined thereto as changes and alterations may be made without departing from the spirit and scope thereof as defined in the appended claim.

I claim:

An engine trouble detecting device comprising a hollow body, vacuum cups secured to said body for securing said body to a support, a starter switch in said body, positive and negative leads connected to said starter switch, adapted for connection to the starter line of the engine to be tested, a master switch in said body, a window formed in said body, positive and negative leads connected to said master switch, adapted for connection respectively to the voltage regulator and coil of the engine to be tested, a pair of electrodes inwardly of said window, means adjusting the gap between said electrodes, positive and negative leads adapted to be connected to said electrodes to a spark plug to be tested, and a spring clamping device at the free end of each of said leads.

References Cited in the file of this patent
UNITED STATES PATENTS

| | | |
|---|---|---|
| 1,641,880 | Cohen | Sept. 6, 1927 |
| 1,850,590 | Malott | Mar. 22, 1932 |
| 2,044,546 | Ryan et al. | June 16, 1936 |